Nov. 30, 1965   R. E. PUCKETT   3,220,115
SINE WAVE TEMPLATE
Filed Dec. 28, 1962
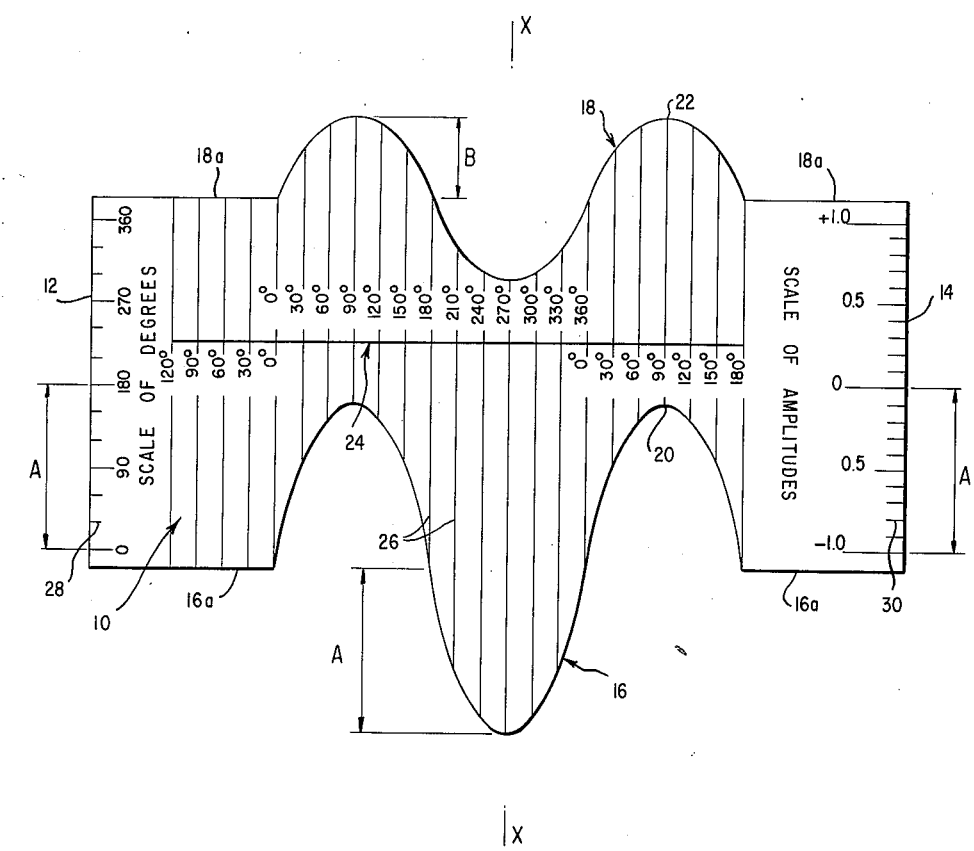
INVENTOR.
RUSSELL E. PUCKETT
BY
Browne, Schuyler and Beveridge
ATTORNEYS

3,220,115
SINE WAVE TEMPLATE
Russell E. Puckett, Lexington, Ky., assignor to Repco, Inc., Lexington, Ky., a corporation of Kentucky
Filed Dec. 28, 1962, Ser. No. 247,909
6 Claims. (Cl. 33—174)

This invention relates to sketching templates, and more particularly to a template especially adapted for use in graphical analysis of sinusoidal functions.

Engineering students and professional engineers frequently encounter problems whose solutions involve the analysis of sinusoidal functions which lend themselves to graphical analysis, either for purposes of obtaining a pictorial representation of physical phenomena or as a means for avoiding complex mathematical procedures and calculations. In many cases, a complex mathematical solution of the problem is performed solely because it is no more time consuming than the tedious process of graphically plotting one or more sine waves with a degree of accuracy sufficient to obtain a reasonably accurate result.

Accordingly, it is a primary object of the invention, to provide a sine wave template which is extremely versatile, convenient to use, and which enables the user to rapidly draw an accurately formed sine wave.

Other objects and features of the invention will become apparent by reference to the following specification and to the drawing.

In the drawings:

The drawing is a plan view of a sine wave template embodying the present invention.

The template shown in the drawings is constructed from a blank of flat transparent sheet material of the same type used for the construction of French curves, draftsman's triangles, etc. The template comprises a main body designated generally 10 which is bounded by a pair of spaced opposed parallel side edges 12 and 14 respectively and a second pair of opposed edges designated generally 16 and 18 respectively. Each of edges 16 and 18 has its central portion curved in the form of a sine wave, while at each end of edges 16 and 18 a straight edge section 16a or 18a respectively extends in a direction perpendicular to side edges 12 and 14. End portions 16a are aligned with each other and are coextensive with a projection of the longitudinal axis of the sinusoidally curved portion of edge 16. A similar relationship exists between edge portions 18a and the curved sine wave central portion of edge 18.

The sine wave portion of edge 16 is formed with an amplitude A which is preferably a whole multiple of the amplitude B of the sine wave formed on edge 18. In the particular template illustrated in the drawing, the amplitude A is twice amplitude B. Each of the sine wave curved portions of edges 16 and 18 presents a curve of one and one-half cycles or an angular displacement of 540°, and the periodic frequency of both sine wave portions is equal. The respective sine waves are in phase so that a concave peak indicated at 20 in the sine wave of edge 16 is in transverse alignment with a convex peak indicated at 22 of the sine wave on edge 18. The template is thus symmetrical about a transverse axis of symmetry X—X.

A first angular scale designated generally 24 is applied to the template in any suitable manner such as printing, engraving, etc. and takes the form of a series of uniformly spaced transverse lines 26 which are parallel to each other and to side edges 12 and 14 and extend entirely across the template to the opposed sinusoidally curved edges. Scale 24 provides an angular scale of measurement or an abscissa scale common to both sine waves. In the template shown in the drawings, the spacing between adjacent parallel lines 26 is selected to be representative of 30° of angular displacement along the respective sine wave longitudinal axes, as indicated by the scale markings. Scale 24 is preferably extended beyond the curved sine wave portions toward side edge 12 for a distance representative of at least 120° for convenience in tracing waves which may be angularly displaced from each other, such as a current or voltage wave representation of a three-phase alternating current.

A second angular scale 28 is applied along side edge 12 and provided with angular degree units corresponding to those employed on scale 24.

Along the opposite side edge 14, an amplitude scale 30 is applied. The length of amplitude scale 30 is equal to twice the larger sine wave amplitude, in this case equal to twice amplitude A. The amplitude scale is provided with gradations in units of one-tenth A, for purposes which will become apparent below.

The relationship between the amplitude and periodic frequency of the curved sine wave portions of the template are chosen such that the distance on the scale corresponding to the amplitude of one of the curves is equal to the distance representative of 90 or 180° of angular measurement. In the template shown in the drawings, this relationship is such that a distance on the scale representative of amplitude A is equal to a distance representative of 180° angular measurement. Because of the fact that amplitude A is equal to twice amplitude B, amplitude B corresponds to 90° of angular measurement on the various scales. Because of this relationship, amplitude scale 30 can also be employed to measure angular measurement in terms of tenths of cycles.

The relationship also enables angular scale 24 to be used to accurately measure amplitude in terms of thirds of amplitude A or B—i.e., 30° on angular scale 24 is equal to one-third amplitude B, 60° on angular scale 24 is equal to one-third of amplitude A. It may further be found convenient to construct the template of a size such that 30° on angular scales 24 and 28 is equal to one centimeter or, alternatively, the size of the template might be selected to be such that amplitude A is equal to one or two inches, for example.

While I have described an embodiment of the invention, it will be apparent to those skilled in the art that the disclosed embodiment may be modified. Therefore, the foregoing description is to be considered exemplary rather than limiting, and the true scope of the invention is that defined in the following claims.

I claim:

1. A template comprising a body of transparent sheet material bounded by a pair of spaced opposed parallel first edges and a pair of spaced opposed second edges, each of said second edges having a central portion thereof formed in the shape of a sine curve with the longitudinal axis of said sine curve extending in a direction perpendicular to first edges, the sine curve on one of said second edges having an amplitude greater than the amplitude of the sine curve on the other of said second edges, both of said sine curves being of the same periodic frequency, first scale means on said body including a series of equally spaced lines parallel to each other and to said first edges defining a common abscissa scale indication for both of said sine curves, and second scale means on said body extending along one of said first edges defining an amplitude scale proportional to the amplitude of said one of said curves.

2. A template as defined in claim 1 wherein the distance along said second scale means representative of a unit amplitude is equal to a distance $na$ where $n$ is a whole integer and $a$ is the distance between adjacent spaced lines of said first scale means.

3. A template as defined in claim 2 wherein the amplitude of the sine curve on said one of said second edges is equal to twice the amplitude of the sine curve on the other of said second edges, said second scale means having a total length equal to two times the amplitude of said first curve and being subdivided into units of one-tenth of the amplitude of said first curve.

4. A template as defined in claim 3 further comprising third scale means extending along the other of said first edges subdivided into unit gradations corresponding to the common abscissa scale indications of said first scale means.

5. A template as defined in claim 4 wherein said first and said third scale means are representative of a unit angular measurement, the unit of amplitude on said second scale means being of a length representative of 180° as measured along said first or said third scale means.

6. A template comprising a body of transparent sheet material bounded by a pair of spaced opposed parallel first edges and a pair of spaced opposed second edges, each of said second edges having straight opposite end portions extending perpendicularly from the respective first edges and a central portion formed in the shape of a sine curve extending between the respective end portions and having a longitudinal axis aligned with said end portions, both of said sine curves having the same periodic frequency and being located in a transverse alignment with each other wherein a convex peak in the sine curve on one of said second edges is in opposed relationship to a concave peak in the sine curve on the other of said second edges, first scale means on said body including a series of equally spaced lines parallel to each other and to said first edges defining a common abscissa scale indication for both of said sine curves, and second scale means on one of said first edges defining an amplitude proportional to the amplitude of at least one of said sine curves, the period and amplitude of said one of said sine curves being related to each other such that the distance along said first scale means representative of one cycle of said one of said sine curves is a whole multiple of the distance along said second scale means representative of the amplitude of said one of said sine curves.

References Cited by the Examiner

UNITED STATES PATENTS

| | | | |
|---|---|---|---|
| 2,487,673 | 11/1949 | Roper | 33—174 |
| 2,821,792 | 2/1958 | Marzani | 33—175 |

FOREIGN PATENTS 237,000 12/1959 Australia.

ISAAC LISANN, *Primary Examiner.*

SAMUEL S. MATTHEWS, *Examiner.*